Jan. 5, 1965   J. E. LINDBERG   3,164,493
METHOD OF APPLYING AN OXIDE COATING TO A METAL TUBE
Filed April 23, 1962
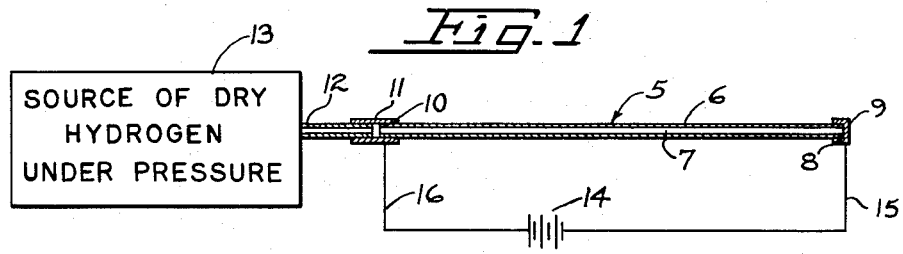
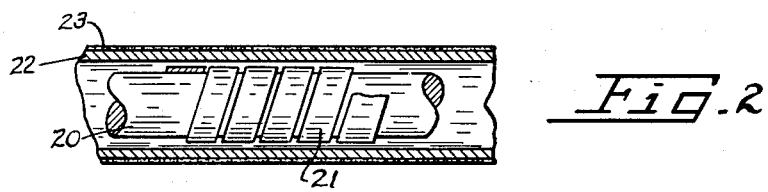
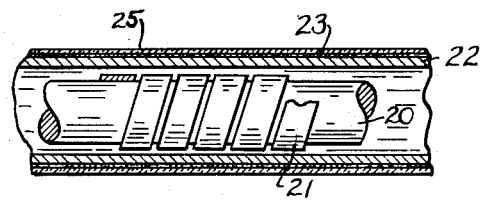
INVENTOR.
JOHN E. LINDBERG
BY
Owen, Wickersham & Erickson
ATTORNEY 3,164,493
METHOD OF APPLYING AN OXIDE COATING
TO A METAL TUBE
John E. Lindberg, 1211 Upper Happy Valley Road,
Lafayette, Calif.
Filed Apr. 23, 1962, Ser. No. 189,433
7 Claims. (Cl. 148—6.3)

This invention relates to a method of applying a highly superior oxide coating to a surface of a metal tube and to a method of applying a ceramic enamel type of coating to a metal tube.

Metal tubes, especially those of nickel and nickel alloys, including stainless steel and Inconel-X, have often proved difficult to insulate, because the ceramic type of insulating enamels do not adhere well to them. It has long been known that an oxide coating aids adherence of such enamels, but oxide coatings heretofore in use have tended to flake off and have not therefore proved to be satisfactory under difficult conditions.

Moreover, there has been a problem of preventing the diffusion of hydrogen through the walls of stainless steel, nickel, and other nickel-alloy tubes. This problem arises, for example, in using fire detector sensors, such as those disclosed in my co-pending patent applications, Serial No. 66,221, filed October 31, 1960, now abandoned (a division of Serial No. 815,406, filed May 25, 1959, now Patent No. 3,122,728) and Serial No. 102,622, filed April 10, 1961, now abandoned (a continuation-in-part of Serial No. 815,406). These sensors employ a metallic hydride inside a tube, usually of stainless steel or nickel; at a triggering temperature, which may be 1000° F. or even higher, the hydride releases great amounts of hydrogen, and when the tube cools, the hydride again takes up this hydrogen. However, the released hydrogen has tended to diffuse through the walls of the tube and be lost, especially when held at a high temperature for a prolonged time; what is once lost cannot be recaptured, and the operating characteristics of the sensor have therefore been changed.

An important element of the present invention has been my discovery (partly disclosed in the earlier-mentioned patent applications) that I can provide on the outside of the tube a particular type of oxide coating that apparently closes the tube pores and at any rate reduces the ability of hydrogen to pass out through the tube walls.

This same sensor, as disclosed in my co-pending applications, Serial No. 11,710, filed February 29, 1960, and Serial No. 126,437, filed July 13, 1961, now Patent No. 3,095,632, is sometimes used as a portion of an electrical circuit for testing the operability of the system of which it is a part. In those instances, it is of course important to provide means for insulating the sensor, and the insulation has to be able to withstand very high (fire) temperatures without burning away or flowing off; so it has been a problem to provide such insulation.

I have discovered that an oxide coating applied according to the present invention acts as an insulator itself. Moreover, it provides a surface that is firmly bonded to the metal tube and a surface to which a ceramic type of insulating coating can be bonded. Tests have demonstrated the superiority of insulating coatings when applied according to this invention. In fact, the diffusion of hydrogen through the tube walls can be held very low when the ceramic is bonded to this oxide coating.

Of course, the invention solves other problems relating to the provision of superior coatings on tube walls and of providing superior bonding surfaces for ceramic materials.

Other objects and advantages of the invention will become apparent from the following detailed description of some preferred forms of the invention.

In the drawings:
FIG. 1 is a diagrammatic representation of one way of carrying out the method of the invention.
FIG. 2 is an enlarged fragmentary view in elevation and in section of a sensor embodying one product produced by the invention.
FIG. 3 is a similar view of a sensor insulated according to the present invention.

Basically, the method of this invention is to provide a superior oxide coating on a metal tube by heating the tube in air or oxygen while diffusing hydrogen through the tube wall. For example, FIG. 1 shows a tube 5 of stainless steel or nickel-A, having a metal wall 6 surrounding a passage 7. One end 8 of the tube 5 is closed, as by a cap 9, and the other end 10 is connected by a coupler 11 to a tube 12 that comes from a source 13 of dry hydrogen under pressure. The pressure may be any amount above the ambient atmospheric pressure, being conveniently 50 p.s.i.g. or 100 p.s.i.g. above atmospheric. This is enough to cause diffusion of the hydrogen from the passage 7 out through the wall 6.

The tube wall 6 is shown placed as a load in an electric circuit, wherein a battery 14 is connected to the tube end 8 by a wire 15 and to the other tube end 10 by a wire 16. By this means, the tube 5 is heated in air to, say, 1200° F. or hotter, and for good metal preferably to 1800° F. or 1850° F. or even up to 2000° F. It will become red hot and will be glowing brightly at 1800° F. If desired, a fan or a blower may be used to blow the air over and around the tube 5. The heating time varies generally with the temperature and with the thickness of the coating desired. Even a few seconds helps and may be enough for some purposes. Two to five minutes at 1800° F. is good for a fire detector sensor, and the longer the better, fifteen or even thirty minutes being very good. I know of no upper limit.

Exactly what happens is not known. Perhaps the exterior surface has pores that would not ordinarily be oxidized and the hydrogen reacts with the oxygen deep in the pores or acts as a catalyst on the reaction of the oxygen with the metal. Perhaps, the hydrogen emerges from the wall as atomic hydrogen rather than molecular; perhaps this atomic hydrogen (if it be such) may induce the oxygen molecules in the air to split into active oxygen which is many times more reactive than molecular oxygen. In any event, the coating even has a different appearance from the usual oxide coating, being smoother, more matte-like, and somewhat darker, and more important, it cannot be wiped off, is not usually affected by repeated bending of the tube, and it seals the metal so that hydrogen can no longer pass out through the wall 6 in quantity. The oxide coating or film is thicker, stronger, less porous, and more reliable than other oxide coatings on that metal known to me.

The heating, shown here as done by a battery 14, may be an alternating-current electrical circuit, may be in an electric furnace (no current then being applied to the tube 5 itself) or can be other means that allow sufficient access of oxygen to the tube 5.

The oxide film produced by this process is very hard, but thin, in the order of 0.0001 inch. It seems to be completely flexible and is undamaged by any bending that does not permanently damage the tube. The film is a very good insulator, with several megohms resistance to gentle contact with metallic objects, and it retains these insulation qualities in the presence of moisture and even when immersed in an ionic salt solution. Also, it will withstand very high temperature.

Tests have shown that with 321 stainless steel having a wall thickness of 0.008 inch, such an oxide film substantially reduces the amount of hydrogen that can be diffused through the walls. For example, in one test, identical untreated tubes of stainless steel 321 were used. One tube was untreated, and the other was treated according to this invention by heating it for fifteen minutes at 1900° F. with hydrogen inside at 90 p.s.i. At room temperature, with hydrogen inside starting at 90 p.s.i., the untreated tube lost 2.5 p.s.i. in 30 minutes by hydrogen diffusion through the walls, while the treated tube lost only 1.1 p.s.i. in 30 minutes. At 1000° F., the untreated tube lost 24 p.s.i. (from 90 p.s.i.) in 30 minutes, while the treated tube lost only 13 p.s.i. in 30 minutes from the same starting pressure. The effect is even more marked with nickel-A.

FIG. 2 is a fragmentary enlarged view of a sensor of the type disclosed in my application Serial No. 102,622. A metal filament 20 such as titanium or zirconium or other suitable hydride-forming metal is wound with a ribbon 21 of molybdenum or tungsten and put into a tube 22 of stainless steel or nickel and is ingassed with hydrogen, so that the filament 20 becomes hydride. The tube 22 is treated substantially as described already, except that the tube 22 is heated and the hydride filament 20 is used as the source of dry hydrogen, to form an oxide film 23, thus giving a sensor 24 that is better able to hold its contained hydrogen and is insulated.

To prevent the film 23 from being scraped off and thereby breaking the insulation, the film 23 may, as shown in FIG. 3, be coated with a suitable insulating enamel 25, such as ceramic glaze, or high temperature glass. The adherence of the coating 25 to the tube 22 is greatly enhanced by being bonded to the film 23 prepared according to the method already described. The tube 22 with the film 23 may be dipped in a slurry or otherwise coated with a prepared mixture and then heated to about 1500° F. to fuse the ceramic on to the coating. When this coating is on, the tube 22 is very well insulated, can be bent without breaking the glaze, is very well protected from abrasion, and there is little diffusion of hydrogen through the walls.

For example, an untreated tube of 321 stainless steel seventeen inches long, 0.040 inch in outer diameter, with a wall thickness of 0.008 inch was compared with a tube of the present invention that had first been oxidized according to this invention and then coated with a ceramic glaze. The untreated tube lost 6.5 p.s.i. in 8 minutes (from 42 p.s.i.) at 1050° F., while the treated tube lost only 4 p.s.i. (from 48 p.s.i.) in 9½ hours at 1050° F.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A method of oxidizing a tube of bare metal having a substantial amount of nickel therein, comprising, heating said tube to an oxidizing temperature in the presence of oxygen while hydrogen gas is under pressure in the tube interior at a pressure level passing hydrogen gas through the walls of said tube.

2. A method of making an insulated metal tube having a very low hydrogen diffusition rate from a tube of bare metal having a substantial amount of nickel therein, comprising,
   passing hydrogen gas into said bare metal tube under pressure enough greater than atmospheric to cause passage of hydrogen through the tube walls while
   heating said tube walls in an oxygen containing atmosphere at a temperature sufficient to cause oxidation, and
   subsequently fusing thereto a ceramic coating.

3. A method of making an insulated metal tube having a very low hydrogen diffusion rate, comprising,
   confining hydrogen gas inside a bare metal tube, said metal containing a substantial amount of nickel, under pressure enough greater than atmospheric to cause passage of hydrogen gas through the walls of the tube while
   heating said tube walls in an oxygen-containing atmosphere at an oxidizing temperature, to produce an oxide coating, and
   subsequently fusing to said coating a ceramic coating.

4. A method of oxidizing a tube of bare metal having a substantial amount of nickel therein, comprising, heating said tube red hot in the presence of oxygen while hydrogen gas is under pressure in the tube interior sufficient to pass hydrogen gas through the walls of said tube.

5. A method of oxidizing a tube of bare metal having a substantial amount of nickel therein, comprising, heating said tube to at least 1200° F. in air while hydrogen gas is under pressure in the tube interior, thereby diffusing hydrogen gas through the walls of said tube.

6. A method of making an insulated metal tube having a very low hydrogen diffusion rate, comprising,
   passing hydrogen gas into a bare metal tube under pressure greater than atmospheric, said metal containing a substantial amount of nickel, while
   heating said tube walls above 1200° F. in an oxygen containing atmosphere, to provide an oxide coating of special properties, and
   subsequently bonding a ceramic coating to said oxide coating.

7. A method of oxidizing one side of a bare metal wall, said metal containing a substantial amount of nickel, comprising heating said side of said wall in the presence of oxygen and at an oxidizing temperature while the other side of the wall is in an atmosphere of high-pressure hydrogen sufficient to cause passage of hydrogen gas through said wall from the other side thereof.

References Cited in the file of this patent

UNITED STATES PATENTS

| | | |
|---|---|---|
| 1,960,808 | Cope | May 29, 1934 |
| 2,975,072 | Bryant et al. | Mar. 14, 1961 |
| 2,975,078 | Rayfield | Mar. 14, 1961 |